United States Patent
Wang et al.

(10) Patent No.: US 12,361,331 B2
(45) Date of Patent: Jul. 15, 2025

(54) SYSTEM AND METHOD FOR AUTOMATIC HYPERPARAMETER SELECTION FOR ONLINE LEARNING

(71) Applicant: Microsoft Technology Licensing, LLC, Redmond, WA (US)

(72) Inventors: Chi Wang, Redmond, WA (US); John Carol Langford, Scarsdale, NV (US); Qingyun Wu, Charlottesville, VA (US); Paul S. Mineiro, Bellevue King, WA (US); Marco Rossi, Harrisonburg, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1056 days.

(21) Appl. No.: 17/308,000

(22) Filed: May 4, 2021

(65) Prior Publication Data

US 2022/0374781 A1 Nov. 24, 2022

(51) Int. Cl.
| | |
|---|---|
| *G06N 20/00* | (2019.01) |
| *G06F 11/34* | (2006.01) |
| *G06F 17/18* | (2006.01) |
| *G06N 20/20* | (2019.01) |

(52) U.S. Cl.
CPC ......... *G06N 20/20* (2019.01); *G06F 11/3428* (2013.01); *G06F 17/18* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,367,120 B2 | 6/2022 | Gupta et al. | |
| 2017/0091673 A1* | 3/2017 | Gupta | G06N 5/022 |
| 2018/0374138 A1 | 12/2018 | Mohamed | |
| 2019/0303112 A1* | 10/2019 | Rajiv | G06F 8/70 |

(Continued)

OTHER PUBLICATIONS

Liang et al. (Liang) "Evolutionary architecture search for deep multitask networks", Research&DevelopmentinInformationRetrieval, ACM,2PennPlaza,Suite701NewYorkNY10121-0701USA,Jul. 2, 2018(Jul. 2, 2018),pp. 466-473,XP058632701,DOI:10.1145/3205455. 3205489ISBN:978-1-4503-5657-2 (Year: 2018).*

(Continued)

*Primary Examiner* — Xuyang Xia

(57) ABSTRACT

Systems and methods for tuning hyperparameters for a machine learning model using a challenger champion model are described. A set of challenger configurations are generated based on a hyperparameter for tuning and a subset of the set of challenger configurations are scheduled for evaluation based on a loss function. A loss value derived from the loss function for the challenger configurations is compared to a loss value derived from the loss function for a champion configuration, and the champion configuration is replaced with the challenger configuration based on the comparison of the loss value derived from the loss function for the challenger configuration and the loss value derived from the loss function for the champion configuration. When the champion is replaced, a new set of challenger configurations is generated based on the new champion configuration.

20 Claims, 11 Drawing Sheets

(56) References Cited

U.S. PATENT DOCUMENTS

| | | | | |
|---|---|---|---|---|
| 2021/0326660 | A1* | 10/2021 | Krishnan | G06V 10/761 |
| 2021/0358178 | A1* | 11/2021 | Staudigl | H04N 19/192 |
| 2022/0300268 | A1* | 9/2022 | Satheesh | G06F 8/71 |

OTHER PUBLICATIONS

Bergstra, et al., "Hyperopt: A Python Library for Model Selection and Hyperparameter Optimization", In Journal of Computational Science & Discovery, vol. 8, Issue 1, Jul. 28, 2015, 15 Pages.

Bergstra, et al., "Random Search for Hyper-Parameter Optimization", In Journal of Machine Learning Research, vol. 13, Feb. 12, 2012, pp. 281-305.

Bianchi, et al., "Prediction, Learning, and Games", In Cambridge University Press., Mar. 13, 2006, 403 Pages.

Blum, et al., "Beating the Holdout: Bounds for k-fold and Progressive Cross-Validation", In Proceedings of the Twelfth Annual Conference on Computational Learning Theory, Jul. 7, 1999, pp. 203-208.

Chaudhuri, et al., "A Parameter-free Hedging Algorithm", In Repository of arXiv:0903.2851v1, Mar. 16, 2009, 10 Pages.

Cutkosky, et al., "Stochastic and Adversarial Online Learning without Hyperparameters", In Journal of Advances in Neural Information Processing Systems, Dec. 4, 2017, pp. 1-19.

Dai, et al., "Model Selection for Production System Via Automated Online Experiments", In Proceedings of 34th Conference on Neural Information Processing Systems, Dec. 6, 2020, pp. 1-11.

Elsken, et al., "Neural Architecture Search: A Survey", In Journal of Machine Learning Research, vol. 20, Issue 55, Mar. 2019, pp. 1-21.

Eriksson, et al., "Scalable Global Optimization via Local Bayesian Optimization", In Journal of Advances in Neural Information Processing Systems, Dec. 8, 2019, pp. 1-16.

Falkner, et al., "BOHB: Robust and Efficient Hyperparameter Optimization at Scale", In International Conference on Machine Learning, Jul. 3, 2018, 10 Pages.

Feurer, et al., "Efficient and Robust Automated Machine Learning", In in Journal of Advances in Neural Information Processing Systems, Dec. 7, 2015, 9 Pages.

Foster, et al., "Parameter-free Online Learning via Model Selection", In Advances in Neural Information Processing Systems, Dec. 4, 2017, pp. 1-22.

Juang, et al., "Efficient Identification of Approximate Best Configuration of Training in Large Datasets", In Proceedings of the AAAI Conference on Artificial Intelligence, Jul. 17, 2019, pp. 3862-3869.

Koch, et al., "Autotune: A Derivative-free Optimization Framework for Hyperparameter Tuning", In Proceedings of the 24th ACM SIGKDD International Conference on Knowledge Discovery & Data Mining, Aug. 19, 2018, pp. 443-452.

Li, et al., "Hyperband: A Novel Bandit-based Approach to Hyperparameter Optimization", In Journal of Machine Learning Research, Apr. 2018, pp. 1-52.

Luo, et al., "Achieving All with no Parameters: Adanormalhedge", In Proceedings of Machine Learning Research, Jun. 26, 2015, pp. 1-19.

Luo, et al., "Autocross: Automatic Feature Crossing for Tabular Data in Real-World Applications", In Proceedings of the 25th ACM SIGKDD International Conference on Knowledge Discovery & Data Mining, Aug. 4, 2019, pp. 1936-1945.

Muthukumar, et al., "Best of many worlds: Robust model selection for online supervised learning", In the 22nd International Conference on Artificial Intelligence and Statistics, Apr. 11, 2019, 10 Pages.

Orabona, et al., "Coin Betting and Parameter-Free Online Learning", In Repository of arXiv:1602.04128v4, Nov. 4, 2016, pp. 1-22.

Real, et al., "AutoML-zero: Evolving Machine Learning Algorithms from Scratch", In International Conference on Machine Learning, Nov. 21, 2020, 13 Pages.

Sato, Masa-Aki, "Online Model Selection Based on the Variational Bayes", In Journal of Neural Computation, vol. 13, Jul. 1, 2001, pp. 1649-1681.

Shalev-Shwartz, et al., "Understanding Machine Learning: From Theory to Algorithms", In Publications of Cambridge University Press, May 19, 2014, 449 Pages.

Snoek, et al., "Practical Bayesian Optimization of Machine Learning Algorithms", In Proceedings of Advances in Neural Information Processing Systems, Dec. 31, 2012, 9 Pages.

Vanschoren, et al., "OpenML: Networked Science in Machine Learning", In Journal of ACM SIGKDD Explorations Newsletter, vol. 15, Issue 2, Jun. 16, 2014, pp. 49-60.

Vapnik, Vladimir, "The Nature of Statistical Learning Theory", Published by Springer, 2000, 334 Pages.

"Personalizer Documentation", Retrieved From: https://web.archive.org/web/20191218040613/https://docs.microsoft.com/en-us/azure/cognitive-services/personalizer/, Retrieved on: Dec. 18, 2019, 2 Pages.

Celik, et al., "Adaptation Strategies for Automated Machine Learning on Evolving Data", In the Repository of arXiv:2006.06480v1, Jun. 9, 2020, 12 Pages.

Liang, et al., "Evolutionary architecture search for deep multitask networks", In the Proceedings of the Genetic and Evolutionary Computation Conference, Jul. 15, 2018, pp. 466-473.

"International Search Report and Written Opinion Issued in PCT Application No. PCT/US22/024132", Mailed Date: Aug. 10, 2022, 11 Pages.

"International Search Report and Written Opinion Issued in PCT Application No. PCT/US23/022877", Mailed Date: Sep. 18, 2023, 12 Pages.

\* cited by examiner

| CHALLENGER_ID $\sim$402 | CONFIGURATION $\sim$404 | RESOURCE LEASE $\sim$406 | PERFORMANCE $\sim$408 | RESOURCE USED $\sim$410 |
|---|---|---|---|---|
| A | $H_1$ | X | $P_1$ | A43d |
| B | $H_2$ | X*4 | $P_2$ | A334 |
| ... | ... | ... | ... | ... |
| C | $H_3$ | X*2 | $P_3$ | BC34 |

SYSTEM AND METHOD FOR AUTOMATIC HYPERPARAMETER SELECTION FOR ONLINE LEARNING

BACKGROUND

Hyerparmeter learning services automatically choose hyperparameter configurations over some set of possible choices. Offline hyperparameter learning strategies fail to satisfy several natural constraints imposed by hyperparameter learning in an online setting. For example, in an online setting, computational constraints are more sharply bounded partially for computational budgetary concerns and partially to keep up with a constantly growing quantity of data. Further, instead of having a fixed data set, hyperparameter learning services in online settings utilize a specified data source with un-bounded, and sometimes very fast, growth. For example, often times datasets will grow at rate that is in the terabytes/day range. On the other hand, many data sources grow at lower rates; accordingly, a learning service that accommodates high data growth rates and low data growth rates is needed. Existing offline learning services evaluate a final quality of the model produced by the implemented learning process; such offline learning services are not evaluating learning algorithms at all times and therefore do not operate in a configuration that is responsive to real-time performance evaluations.

Accordingly, naively applying an existing offline learning services algorithms on the data collected from an online source does not address the computational constraints, as direct use of offline learning services algorithms are impractical when the dataset is large (e.g., terascale or above). Operating on subsets of the data would be necessary; however, due to the dramatic potential performance differences in learning algorithms given different dataset sizes, the choice of subset size is critical and data-dependent. Automating such a choice is non-trivial in general. In addition, such an approach does not address the issue of intermediate evaluation, as offline learning services algorithms are assessed on the quality of the final configuration produced. However, in online learning services, there is no natural point to stop training, evaluate a configuration, and try the next configuration. That is, if a fixed set of configurations are constantly evaluated, other configurations are denied the evaluation experience, which could lead to linearly increasing total regret during the learning process. It is with respect to these and other general considerations that embodiments have been described. Also, although relatively specific problems have been discussed, it should be understood that the embodiments should not be limited to solving the specific problems identified in the background.

SUMMARY

In examples, a method that can allocate a limited computational power (at any time point) to learning models while maintaining good on-line performance (i.e., low regret) and working despite an unknown required example threshold is described.

Aspects of the present disclosure are directed to a method for tuning a hyperparameter for a machine learning model, the method comprising: receiving a hyperparameter for tuning; generating a set of challenger configurations based on the hyperparameter; scheduling a subset of the set of challenger configurations for evaluation based on a loss function; comparing a loss value derived from the loss function for the set of challenger configurations to a loss value derived from the loss function for a champion configuration; replacing the champion configuration with a challenger configuration based on the comparison of the loss value derived from the loss function for the challenger configuration and the loss value derived from the loss function for the champion configuration; and generating a new set of challenger configurations based on a new champion configuration.

Aspects of the present disclosure are directed to a system for tuning a hyperparameter for a machine learning model. The system may include a processor and memory including instructions which when executed by the processor, cause the processor to: receive a hyperparameter for tuning; receive configuration information associated with generating challenger configurations for the hyperparameter; generate a set of challenger configurations based on the hyperparameter and the configuration information; schedule a subset of the set of challenger configurations for evaluation based on a loss function; compare a loss value derived from the loss function for the challenger configurations to a loss value derived from the loss function for a champion configuration; replace the champion configuration with a challenger configuration based on the comparison of the loss value derived from the loss function for the challenger configuration and the loss value derived from the loss function for the champion configuration; and generate a new set of challenger configurations based on a new champion configuration.

Aspects of the present disclosure are directed to a computer-readable storage medium including instructions, when executed by a processor, cause the processor to: receive a hyperparameter for tuning; generate a set of challenger configurations based on the hyperparameter; schedule a subset of the set of challenger configurations for evaluation based on a loss function; compare a loss value derived from the loss function for the set of challenger configurations to a loss value derived from the loss function for a champion configuration; replace the champion configuration with a challenger configuration based on the comparison of the loss value derived from the loss function for the challenger configuration and the loss value derived from the loss function for the champion configuration; and generate a new set of challenger configurations based on a new champion configuration.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 4 depicts an example data structure in accordance with examples of the present disclosure.

DETAILED DESCRIPTION

Figure 1:
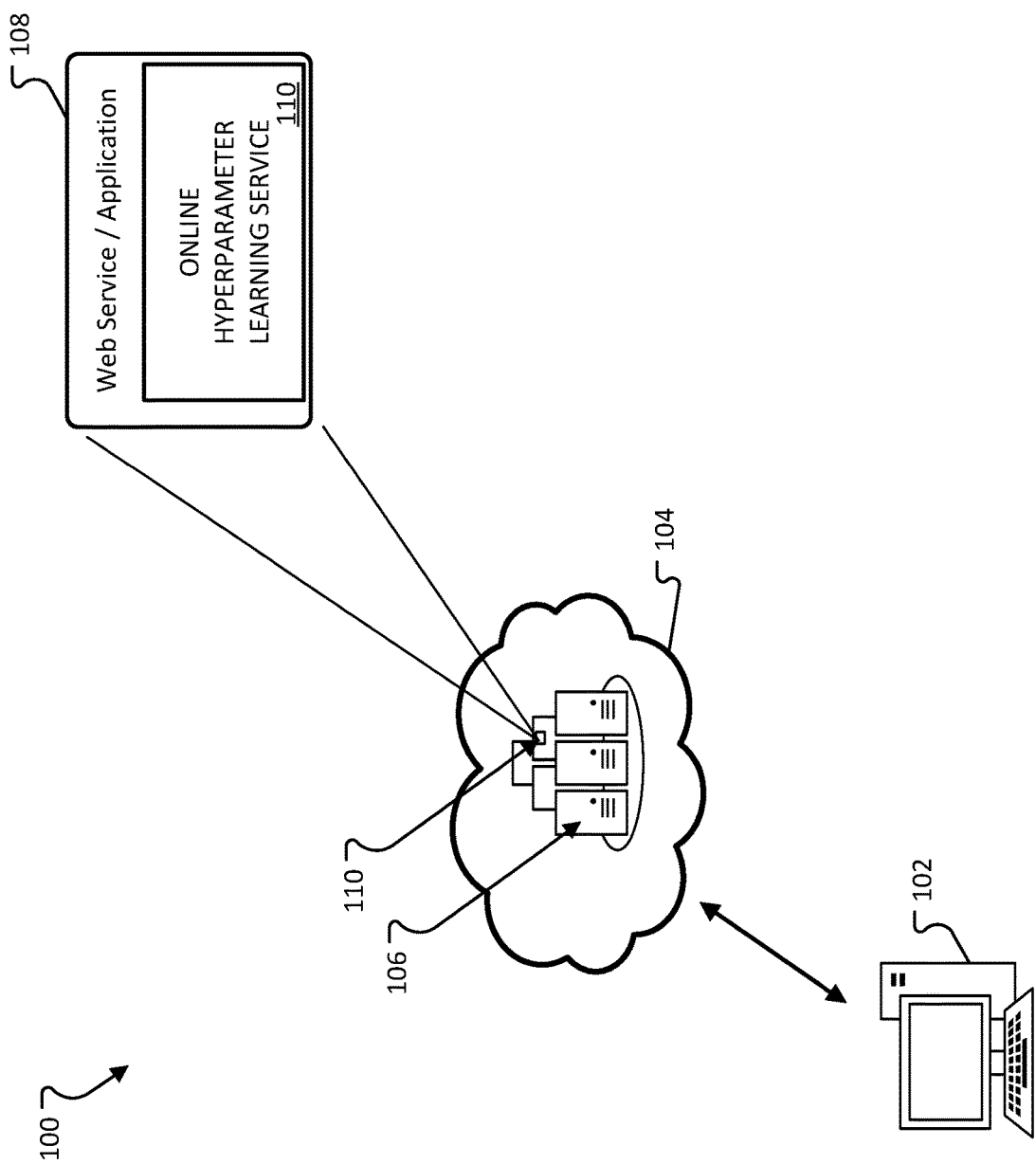
FIG. 1 depicts an example system illustrating a hyperparameter learning service and/or a neural network training service in accordance with examples of the present disclosure.

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Examples of the present disclosure are generally directed to systems and methods that can allocate limited computational power (at any time point) to learning models while maintaining good on-line performance (i.e., low regret), despite an unknown required example threshold that is needed. Accordingly, details of an online automated machine learning setting with tight computational constraints consistent with standard online learning settings is described. In examples, a multiplicative constant corresponding to a maximum number of "live" models that may be evaluated at any one time may be based on an amount of computational resources available. The availability of a configuration oracle, which takes as input a configuration and provides as output a set of possible configurations to try next, is also described. The configuration oracle is designed to capture the knowledge of a domain expert or offline learning services methods to propose natural alternatives which may yield greater performances. The configuration oracle may propose configurations than can be simultaneously assessed given a computational budget, such that computational resources are allocated across possible configurations in a manner that does not limit potentially best possibilities and which does not waste computational resources and experience.

In accordance with examples of the present disclosure, several terms used throughout this disclosure document are described. Examples are drawn from a data space X×Y, where X may correspond to the input domain (e.g., input data) and Y may correspond to the output domain (e.g., predicted output and/or ground truth output). A function $f: X \to Y$ maps input features to an output prediction. A learning algorithm $A: X \times (X \times Y)^* \to Y$ maps a dataset and a set of input features to a prediction. A loss function $l: Y \times Y \to \mathbb{R}$ defines a loss for any output and prediction. $L_f := \mathbb{E}_{(X,Y)}[l(f(X), Y)]$ denotes the true loss of hypothesis $f$. $L^*_F := \mathbb{E}[l(f(x_t), y_t)]$ denotes the best loss achievement using the best fixed choice of parameters in a function class F, which contains a set of functions. $f^*$ denotes the best function given loss function l and the data distribution.

The following online learning setting is described. At each interaction t, a learner receives a data sample $X_t$ from an input domain, and then makes a prediction of the sample $A(X, D_t)$ based on knowledge from the historical data samples $D_t$. After making the prediction, the learner receives a feedback, which can be a full-information or partial-information feedback, the latter also known as bandit feedback, from the environment. Based on the feedback, the learner measures the loss and updates a prediction model by some strategy so as to improve predictive performance on future received data samples. In such an online learning setting, the cumulative loss $\Sigma_{t=1}^{T} L_{A(D_t)}$ from the online learning A over the whole interaction horizon T is compared to the loss of the best function $f^*$. The gap between the cumulative loss from the online leaner A and the loss of the best function $f^*$ is termed regret and provided by $R(T) := \Sigma_{t=1}^{T}(L_{A(D_t)} - L_{f^*})$.

FIG. 1 depicts an example system 100 illustrating a hyperparameter learning service and/or a neural network training service in accordance with examples of the present disclosure. More specifically, the system 100 may include a client device 102 which may be a computing device or other device in communication with a cloud services provider 106. The cloud services provider 106 may be accessible via a network 104 configured to provide a means of communication between the client device 102 and the cloud services provider 106. The cloud services provider 106 may include one or more data servers. A non-limiting example configuration of a cloud services provider 106 includes a multi-tenant computing platform configured to include multiple tenant environments. The multiple tenant environments may divide the multitenant computing platform into divisions, areas, or containers such that a user has specific access or operational rights to a certain tenant area. Because the tenants share a same multitenant computing platform, resources provided by the cloud services provider 106 may be utilized in a more efficient manner but may be distributed amongst various tenants thereby reducing the total amount of computational resources available to any one tenant.

The client device 102 may make a request to the cloud services provider 106 for tuned hyperparameters. In one example, the client device 102 may make a request to the cloud services provider 106 for a trained neural network model, where the trained neural network model is a large neural network model and include tuned hyperparameters. The cloud services provider 106 may route the request to a specific tenant to fulfill the request. In some examples, the client device 102 may be interacting directly with a tenant. Accordingly, the request may be fulfilled by a web service or application 108 that exposes or otherwise makes available the tuned hyperparameters via an online hyperparameter learning service 110.

Accordingly, a client device 102 may provide a neural network with the request, a dataset with the request, or both the neural network model and the dataset with the request. The online hyperparameter learning service 110 may generate the tuned hyperparameters as previously discussed and provide the tuned hyperparameters back to the requesting client device 102. In some examples, the online hyperparameter learning service 110 may generate a link to the tuned hyperparameters and/or to a trained neural network available in order to provide the trained neural network and/or the tuned hyperparameters to the client device 102. In some examples, the online hyperparameter learning service 110 sends the tuned hyperparameters and/or trained model directly to the client device 102. In some examples, the client device 102 may directly contact the web service and/or application 108 thereby bypassing the multitenant computing platform.

Figure 2:
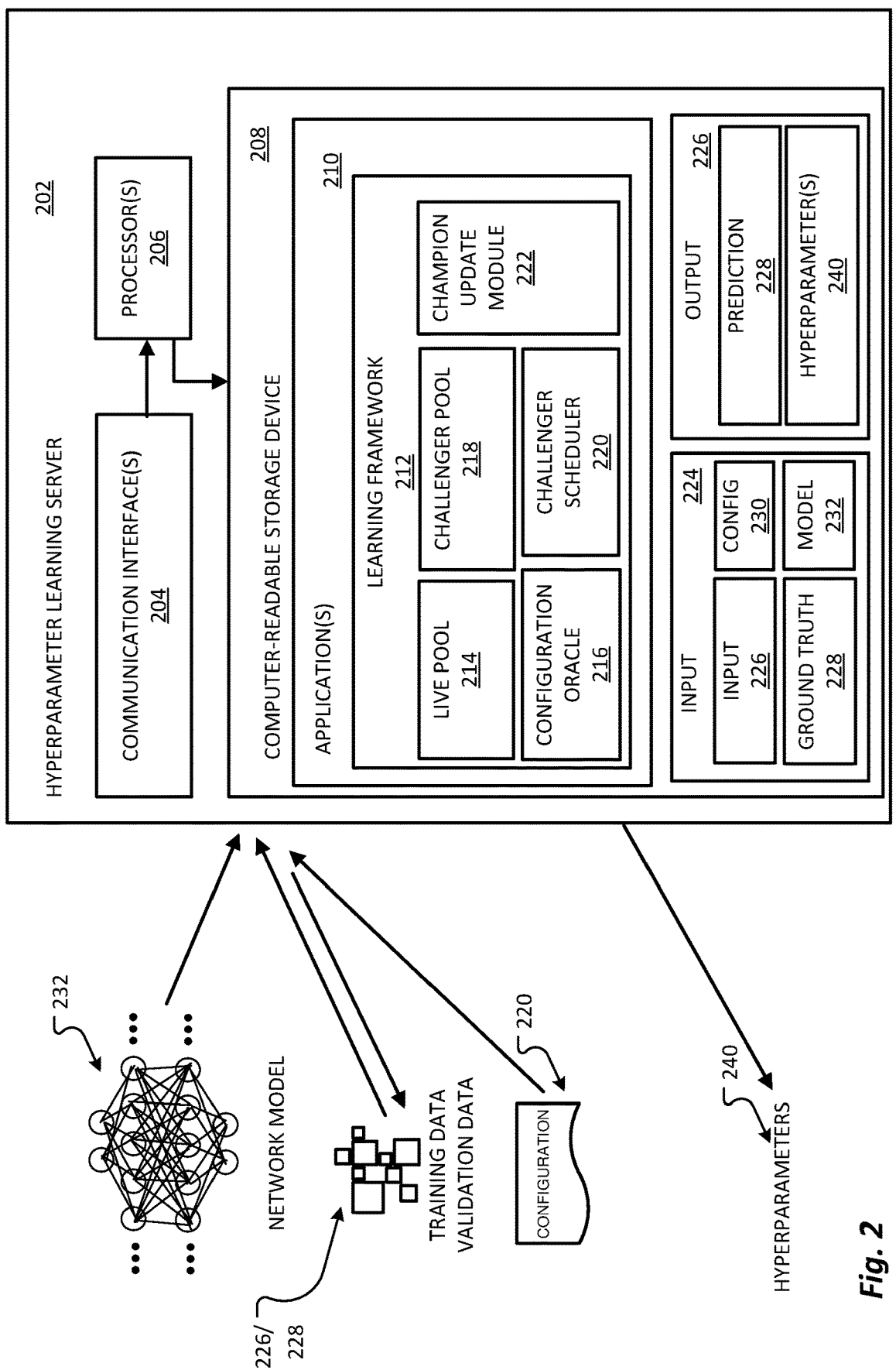
FIG. 2 depicts an online hyperparameter learning server in accordance with examples of the present disclosure.

FIG. 2 depicts an online hyperparameter learning server 202 in accordance with examples of the present disclosure. In one example, the online hyperparameter learning server 202 may provide the online hyperparameter learning service 110 (FIG. 1). The online hyperparameter learning server 202 includes one or more processor(s) 206, one or more communication interface(s) 204, and a computer-readable storage device 208 that stores computer-executable instructions for one or more applications 210, input 224 for the one or more applications 210, and output 226 resulting from one or more functionalities of the applications 210.

The various functional components of the online hyperparameter learning server 202 may reside on a single device or may be distributed across several computing devices in various arrangements. The various components of the online hyperparameter learning server 202 may access one or more databases and each of the various components of the online hyperparameter learning server 202 may be in communication with one another. Further, while the components of FIG. 2 are discussed in the singular sense, it will be appreciated that in other examples multiple instances of the components may be employed.

The one or more processor(s) 206 may be any type of commercially available processor, such as processors available from the Intel Corporation, Advanced Micro Devices, Texas Instruments, or other such processors. Further still, the one or more processor(s) 206 may include one or more special-purpose processors, such as a Field-Programmable Gate Array (FPGA) or an Application Specific Integrated Circuit (ASIC). The one or more processors 208 may also include programmable logic or circuitry that is temporarily configured by software to perform certain operations. Thus, once configured by such software, the one or more processor(s) 206 become specific machines (or specific components of a machine) uniquely tailored to perform the configured functions and are no longer general-purpose processors.

The one or more communication interface(s) 204 are configured to facilitate communications between the online hyperparameter learning server 202 and one or more client devices 102. The one or more communication interface(s) 204 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The computer-readable storage device 208 includes various applications 210, input 224, and output 226 for implementing the online hyperparameter learning server 202. The computer-readable storage device 208 includes one or more devices configured to store instructions and data temporarily or permanently and may include, but not be limited to, random-access memory(RAM), read-only memory (ROM), buffer memory, flash memory, optical media, magnetic media, cache memory, other types of storage (e.g. Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the applications 210, input 224, and the output 226. Accordingly, the computer-readable storage device 208 may be implemented as a single storage apparatus or device, or, alternatively and/or additionally, as "cloud-based" storage systems or storage networks that include multiple storage apparatus or devices. The computer-readable storage device 208 may exclude signals per se. In examples, the online hyperparameter learning server 202 is an autoML server; that is, the online hyperparameter learning server 202 may automatically perform one or more hyperparameter tuning processes for a machine learning model.

In one example, the applications 210 are written in a computer-programming and/or scripting language. Examples of such languages include, but are not limited to, C, C++, Java, JavaScript, Perl, Python, or any other computer programming and/or scripting language now known or later developed.

With reference to FIG. 2, the applications 210 of the online hyperparameter learning server 202 include, but are not limited to, a live pool 214, a configuration oracle 216, a challenger pool 218, a challenger scheduler 220, and a champion update module 222. The input 224 may include, but is not limited to an input 224 such as data from a data space X, ground truth information 228, such as ground truth data Y, configuration information 230, such as configuration oracle information, and a network model 232, such as one or more initial hyperparameters. The output 226 may include predicted information, such as a $\hat{Y}$, and learned hyperparameters 240 for a resulting model.

The online hyperparameter learning server 202 may receive a neural network model 232, input 224, ground truth information 228, and configuration oracle information 216. The configuration oracle 216 may generate a plurality of models based on the configuration information 230 and the network model 232. In examples, the plurality of models are also referred to as a plurality of configurations. Each model may correspond to a namespace configuration, where a namespace includes a group of features. The plurality of models may reside in the challenger pool 218. The challenger pool 218 may maintain a plurality of models and may associate a resource lease specific to each model of the models. While performance or evaluation information for each of the models residing in the challenger pool 218 may not persist, the resource lease specific to each model may persist and may be used at least in part when such model is evaluated in the live pool 214. In examples, the challenger scheduler 220 may select a set of models from the challenger pool 218 and schedule the models to be evaluated in accordance with a resource lease. In examples, the resource lease may correspond to an amount of compute the model is permitted to consume, an amount of time the model is permitted to execute, and/or a number cycles the model is permitted to consume. In accordance with a timed event and/or time step for example, each model in the live pool 214 may be evaluated.

Each model in the live pool 214 may be evaluated based on a performance error or loss function as previously described. In examples, a predicted output from a model may be compared to ground truth information to obtain a loss or error. In some instances, a subset of the models in the live pool 214 may be returned to the challenger pool 218; for example, the bottom fifty percent of the models may be returned to the challenger pool 218. Upon returning the models to the challenger pool 218, a resource lease may be increased, for example, doubled. The challenger scheduler 220 may then select a plurality of models from the challenger pool 218. In examples, the challenger scheduler 220 may select a model for each model returned to the challenger pool 218. In some examples, the models selected may have the lowest resource lease time out of the other models in the challenger pool 218.

In accordance with examples of the present disclosure, the champion update module 222 may evaluate one or more of the models in the live pool 214 against a champion model. The champion may be a model currently exhibiting a lowest loss and/or lowest error. In examples, estimated upper and lower loss or error bounds of the challenger model (e.g., c), may be compared to estimated upper and lower loss error bounds of the champion model. Based on the comparison, the challenger model (e.g., c) may replace the champion (e.g., C), may return to the live pool 214, or may be removed from the challenger pool 218 and the live pool 214. For example, an evaluation based on the worst case scenario (e.g., estimated highest error bound) associated with the challenger (e.g., c) may be compared to the best case scenario (e.g., estimated lowest error bound) of the champion (e.g., C). In examples, where the estimated highest error of the challenger (e.g., c) is less than the estimated lowest error of the champion (e.g., C), the challenger may replace the champion. Upon replacing the champion, the configuration oracle 216 generates a new set of models for the challenger pool 218.

In examples, each model may correspond to a namespace configuration, where a namespace includes a group of features. One or more hyperparameters 240 may be generated by the online hyperparameter learning server 202, where the one or more hyperparameters may be tuned hyperparameters specifying which namespaces interact with one another. As an example, an interacting namespace a and namespace b may create a new feature for every feature in a and every feature in b via an outerproduct operation. Given a dataset whose features are grouped into namespaces, using all the original namespaces without interactions as the initial configuration may be an initial network model 232 (e.g., $c_{init}$). As an example directed to feature interaction, given a namespace configuration, the configuration oracle 216 generates all configurations that have one additional second order interaction on the input namespaces. For example, given a configuration with 3 namespaces C={$e_1$, $e_2$, $e_3$}, the configuration oracle 216 may generate {{$e_1$, $e_2$, $e_3$, $e_1e_2$}, {$e_1$, $e_2$, $e_3$, $e_1e_3$}, {$e_1$, $e_2$, $e_3$, $e_2e_3$}}. When provided with a input configuration with k namespaces, the configuration oracle 216 generates candidate set with $$\frac{k(k-1)}{2}$$

configurations, where in some instances, duplicate configurations may be removed. Thus, the configuration oracle 216 may generate a number of configurations, or models, and the challenger scheduler 220 may select a number of models, or configurations, to be included in the live pool 214; such selection may be based on an amount of computational resources available.

Figure 3:
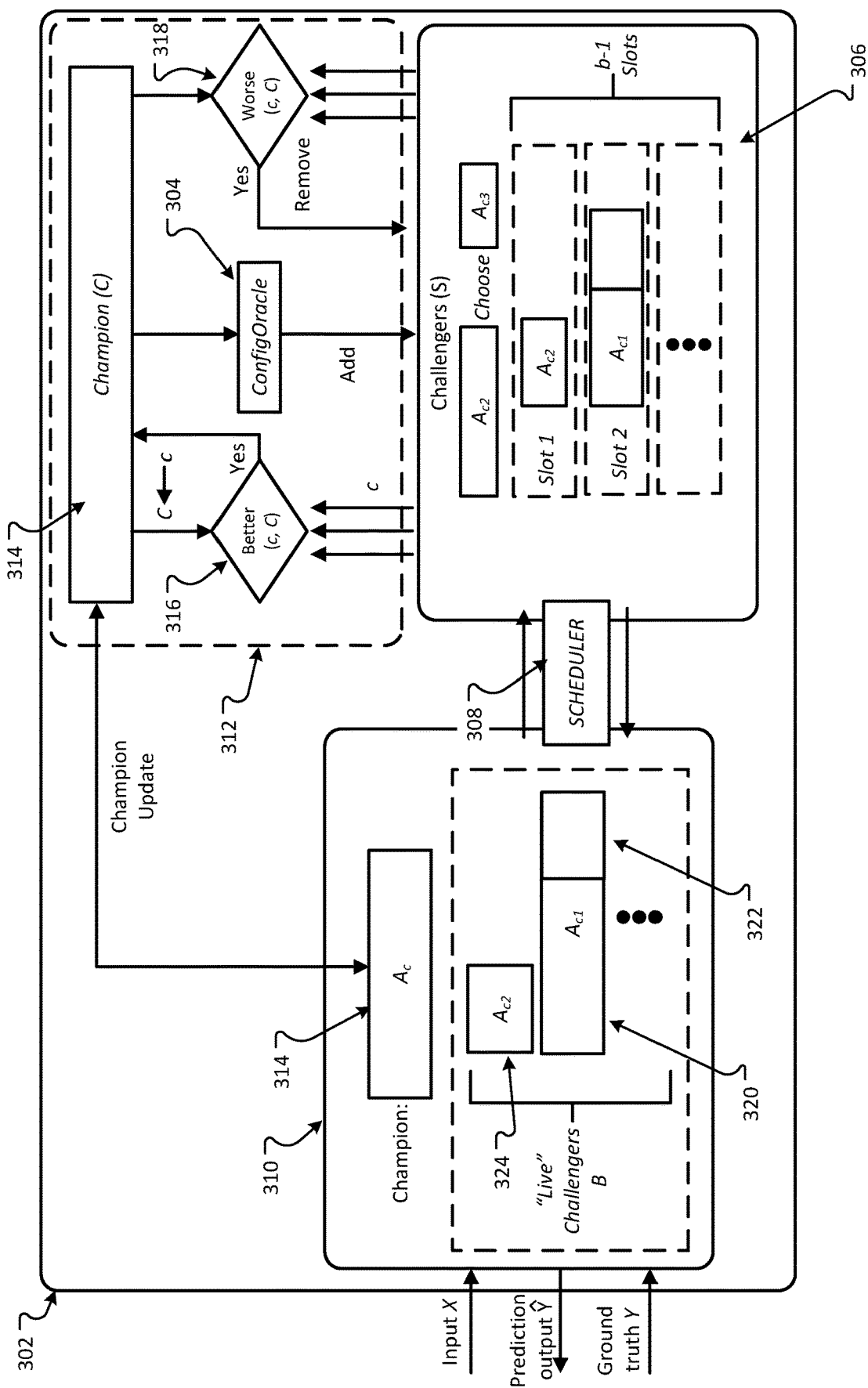
FIG. 3 depicts additional details of the learning framework in accordance with examples of the present disclosure.

FIG. 3 depicts additional details of the learning framework 212 (FIG. 2) in accordance with examples of the present disclosure. Solving an online learning services problem requires finding a balance between searching over a large number of plausible choices and concentrating the limited computational budget on a few promising choices such that a high 'learning price' (regret) can be avoided. The learning framework 212 relies on a progressive expansion of the search space according to the online performance of existing configurations and amortizes scheduling of the limited computational resources to configurations under consideration. To realize these two ideas, the configurations under consideration are categorized into one champion 314, denoted by C, and a set of challengers 306, denoted by S. The champion 314, C, is the best proven configuration at the concerned time point. The rest of the candidate configurations are considered as challengers 306. The learning framework 302 starts by setting the initial or default configuration, denoted by tint as the champion 314, and starts with an empty challenger set, i.e, S=0. As the online learning process proceeds, the champion 314 is updated when necessary and may add more challengers in a progressive manner.

For example, the scheduler 308 may assign one of the b slots for 'live' models to the champion 314, and perform amortized scheduling of the challengers for the remaining b−1 slots when the number of challengers is larger than b−1. In the case where b>1, challengers 306 are evaluated which provides the opportunity to find potentially better configurations. With b 'live' models running, the learning framework 302 at each iteration selects one of the live running models from the set of live challengers B 310 to do the final prediction, where the live running models include the champion 314.

The learning framework 302 utilizes the configuration oracle 304 to generate challengers and a champion. When provided with a particular input configuration c, the configuration oracle 304 produces a candidate configuration set that contains at least one configuration that is significantly better than the input configuration c each time a new configuration is provided to it. Such a configuration oracle 304 may be constructed with domain expertise or one or more offline autoML (auto machine learning) algorithms. For example, when the configurations represent feature interaction choices, one way to construct the configuration oracle 304 is to add pairwise feature interactions as derived features based on the current set of both original and derived features. With the availability of such a configuration oracle 304, a champion 314 may be used as the 'seed' to the configuration oracle 304 to construct a search space which is then expanded only when a new champion is identified.

The learning framework 302 updates the champion 314 when a challenger is proved to be 'sufficiently better' than it. A statistical test with sample complexity bounds to assess the true quality of a configuration and promote new champions is used. The statistical test uses sample complexity bounds and empirical loss to assess the 'true' performance of the identified configuration c through a probabilistic lower and upper bound. The learning framework 302 eliminates a challenger from consideration once the result of Worse test 318 is positive and promotes a challenger to the new champion once the result of a Better test 316 is positive. When a new champion is promoted, a series of subsequent operations are triggered, including (a) an update of the learning framework's champion 314 and (b) a call of the configuration oracle 304 to generate a new set of challengers to be further considered.

When testing whether a challenger c should be promoted into a new champion using the described Better test 316, the gap between the lower and upper bounds may be sized to a specific value. This ensures that a challenger is promoted into a champion only when it is 'sufficiently' better than the old champion, a strategy which avoids the situation where champions are routinely switched and are only slightly better than the old ones. That situation is undesirable for two reasons: (a) it does not guarantee any lower bound on the loss reduction and thus the true loss between the champion and the true best configuration may remain larger than a constant, which causes a linearly increasing regret in the worst case, and (b) since new challengers are generated and added into consideration, it makes the challenger pool unnecessarily large.

Once a set of challengers 310 is obtained, if the number of 'live' model slots is larger than the number of challengers (either because b is large or because the set of Challengers (S) 310 is small, the challengers 310 can be evaluated simultaneously. Otherwise the challengers must be scheduled. The scheduling problem is challenging since: (1) the models do not persist so frequent updates of the 'live' challengers is costly in terms of learning experience; and (2) a blind commitment of resources to particular choices may fail due to those choices yielding poor performance. In one example, a principled way to amortize this cost is to use the doubling trick when allocating the sample resource: assign each challenger an initially small lease and successively double the lease over time. The amortized resource allocation principle together with a special consideration of the challengers' empirical performance are utilized when scheduling. Scheduling is realized through the scheduler 308, which may be a schedule function in the learning framework 302. Specifically, the scheduler 308 takes as input the budget b, the current 'live' challenger set B, the candidate set S, and provides as output a new set of live challengers (which can have overlap with the input B). The scheduler 308 is designed to eventually provide any configuration with any necessary threshold of examples required for a regret guarantee. Initially, every configuration is assigned a particular minimum resource lease $n_c = n_{min}$ (for example $n_{min}$=5_#features). When a configuration has been trained with $n_c$ examples, i.e., reaches its assigned resource lease, the resource lease is doubled.

As depicted in FIG. 3, an example of a model filling a slot is described. More specifically, the model 320 may occupy a slot or location in the "live" challengers B pool; the model 320 may be associated with a lease 322. As illustrated in FIG. 3, the lease 322 for model 320 is sufficient for the model 320. As further depicted in FIG. 3, the model 324 is nearing the end of the lease.

To avoid starving a challenger under consideration indefinitely, the challenger that just reached its assigned resource lease is removed from the 'live' challenger pool and the challenger with the minimum resource lease is added into the 'live' challenger pool. In addition, to avoid throwing away valuable experience for a promising challenger, a 'live' challenger which reaches its assigned resource lease is replaced only if it is not among the top performing (according to loss upper bound) 'live' challengers. In other words, half of the compute resources are used to exploit the candidates that have good performance for now, and another half to explore alternatives that may have better performance if given more resources. With the b 'live' models running, at each interaction, the learning framework 302 selects one of the live models to make the prediction following a structural risk minimization principle.

FIG. 4 depicts an example data structure 400 in accordance with examples of the present disclosure. The data structure 400 may correspond to a model, or configuration, as previously discussed. The data structure 400 may include a challenger identifier 402 and the specific configuration 404. In addition, a lease associated with the challenger identifier 402 may be maintained in the field 406. The lease associated with the challenger identifier 402 may include both an amount of time of the lease and an amount of time remaining on the lease. In some examples, the performance of the challenger associated with the challenger identifier 402 may be maintained in the data structure 400 during the live processing of the configuration. Alternatively, or in addition, the performance of the challenger does not persist if the challenger is returned to the challenger pool. In some examples, the performance of each of the model, or configuration, may also be tracked or included in the field 408. Similarly, an amount of resources used and/or an identification of the resources used may be included in the field 410.

Figure 5:
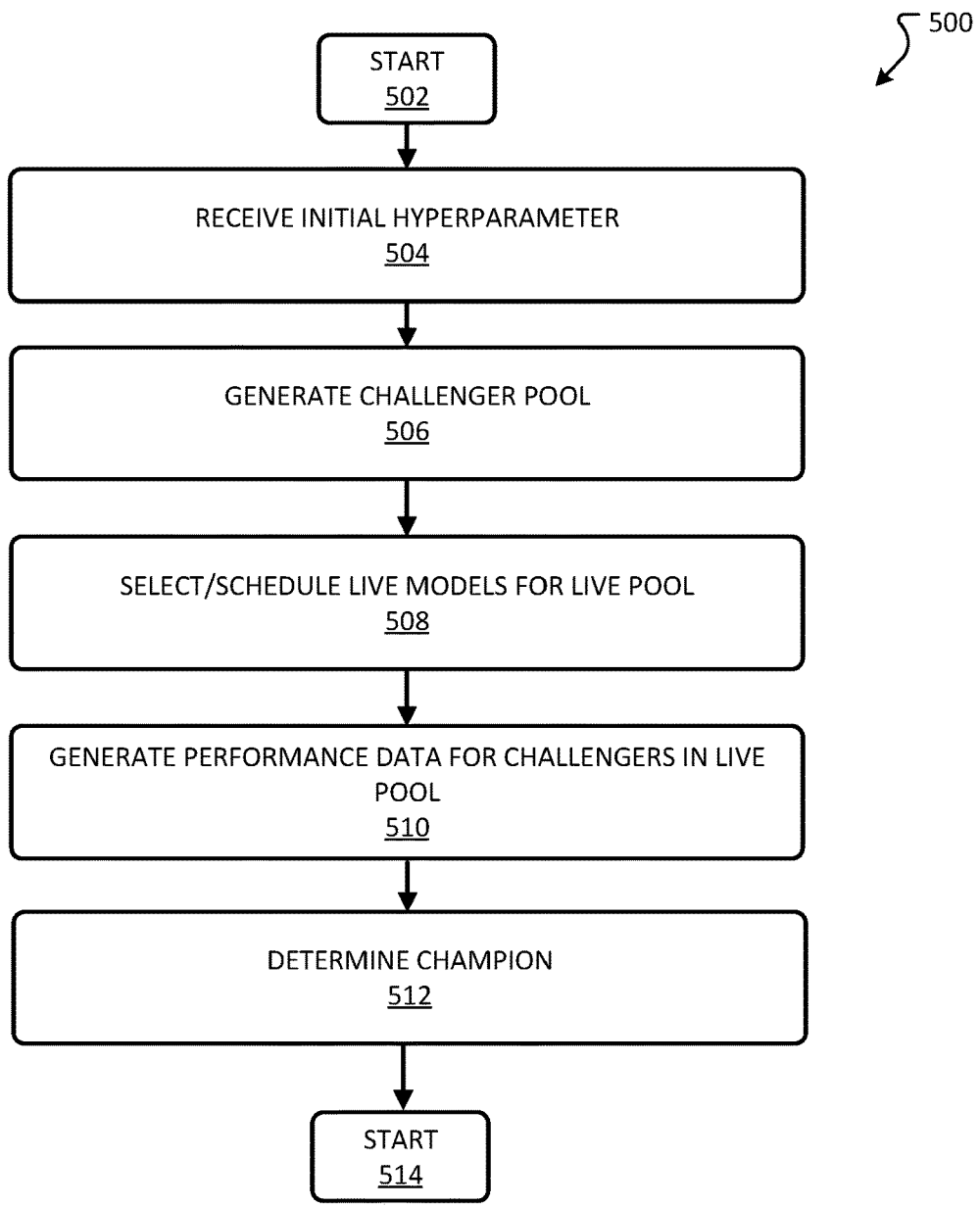
FIG. 5 depicts details of a method for determining a champion in accordance with examples of the present disclosure.

FIG. 5 depicts details of a method 500 for determining a champion in accordance with examples of the present disclosure. A general order for the steps of the method 500 is shown in FIG. 5. Generally, the method 500 starts at 502 and ends at 514. The method 500 may include more or fewer steps or may arrange the order of the steps differently than those shown in FIG. 5. The method 500 can be executed as a set of computer-executable instructions executed by a computer system and encoded or stored on a computer readable medium. In examples, aspects of the method 500 are performed by one or more processing devices, such as a computer or server. Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method starts at 502, where flow may proceed to 504. At 504, an initial hyperparameter and a configuration of the configuration oracle are received from a user. The method may proceed to 506, where models for a challenger pool are generated. In examples, the models may be generated by a configuration oracle as previously discussed. The method may proceed to 508, where a scheduler may select a subset of the challenger pool to be part of the live challengers. The method may proceed to 510, where performance data for one or more models in the live challengers pool are generated and compared to the performance loss of an existing champion. In examples and based on the performance loss information, a new champion may be identified. The method 500 may proceed to 514 where such method ends.

Figure 6:
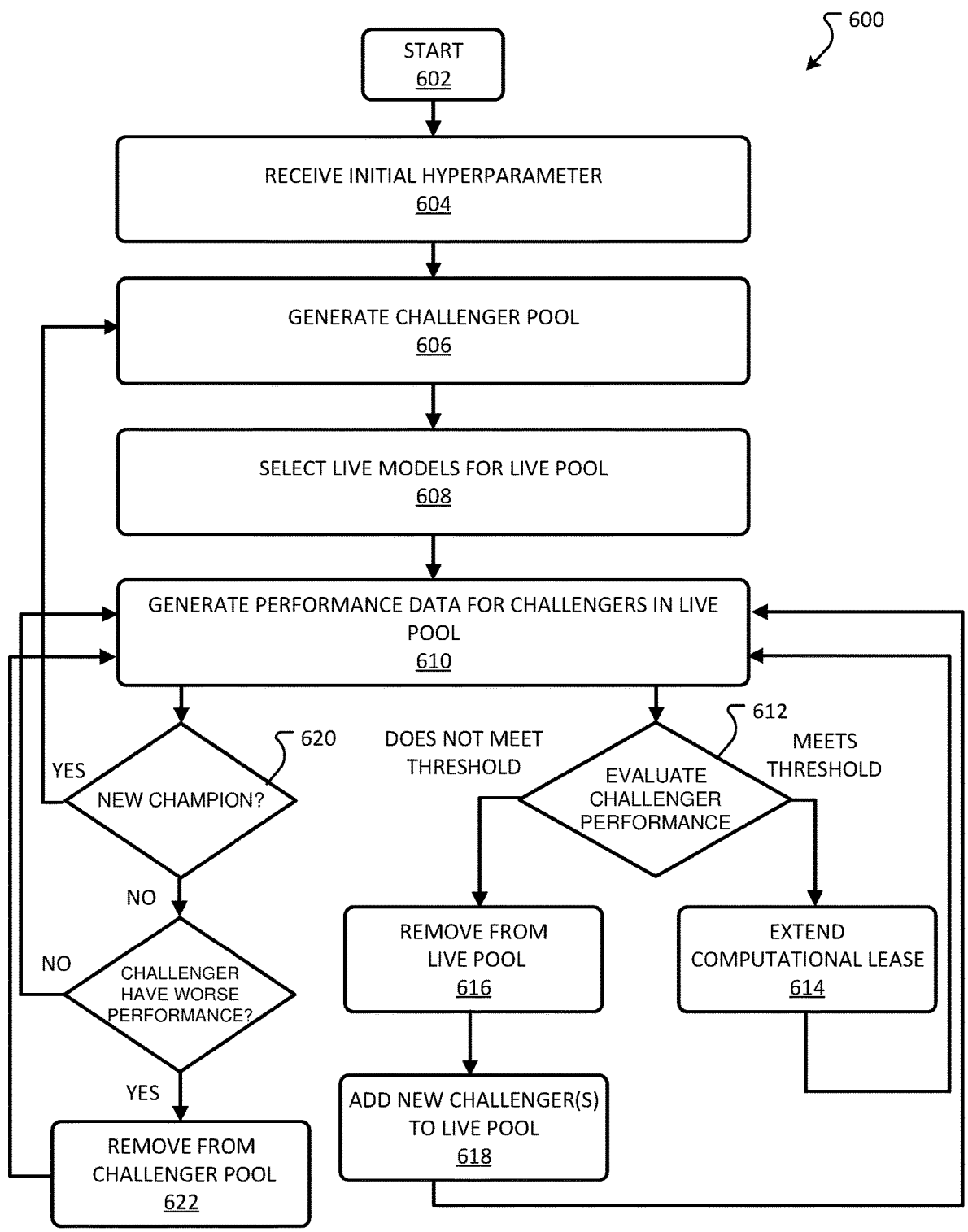
FIG. 6 depicts details of a method for tuning one or more hyperparameters in accordance with examples of the present disclosure.

FIG. 6 depicts details of a method 600 for tuning one or more hyperparameters in accordance with examples of the present disclosure. A general order for the steps of the method 600 is shown in FIG. 6. Generally, the method 600 starts at 602. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method starts at 602, where flow may proceed to 604. At 604, an initial hyperparameter and configuration information for the configuration oracle are received. In examples, the initial hyperparameter and/or the configuration of the configuration oracle may be received form a user; alternatively, or in addition, the hyperparameter and/or the configuration of the configuration oracle may be selected from a list of available configurations and/or hyperparameters. The method may proceed to 606 where models for a challenger pool are generated. In examples, the models may be generated by a configuration oracle as previously discussed. The method may proceed to 608, where a scheduler may select a subset of the models in the challenger pool to be part of the live challengers pool. In examples, the challenger(s) in the challenger pool having the smallest lease may be chosen. The method may proceed to 610, where performance data for one or more models in the live challengers pool are generated. For example, a selected model may receive, as input, data from an data space X; the selected model may then generate an output Y. Based on a ground truth value Y, performance data for the selected model may be generated. In examples, the performance data may be based on a loss function. The method 600 may then proceed down two potential paths, in parallel and/or serially.

In a first example, the method 600 may proceed to 612, where a challenger performance is evaluated with respect to other challengers. For example, a live challenger which reaches its assigned resource lease may be removed from the live pool at 616 and returned to the challenger pool if the challenger is not among the top performing challengers or otherwise does not meet a specific threshold. The challenger that is returned to the challenger pool may have the lease extended when added back to the challenger pool. At 618, a new challenger may be selected from the challenger pool and may be added to the live pool, where the new challenger may be selected based on the challenger having the minimum resource lease. A loss upper bound may be used to evaluate the challenger with respect to other challengers. In other words, half of the compute resources may be used to exploit candidates that have a good performance now, and another half of the compute resources may be used to explore alternatives that may have better performance if given more resources. The method 600 may then proceed to 610 where performance data for the challengers in the live pool may be generated as previously described. At 612, if the challenger performance is determined to be in the top half, highly ranked based on a loss upper bound, or otherwise meets a threshold, then the lease associated with the challenger may be extended. In some examples, the lease may be doubled.

In some examples, the performance of a challenger may be compared to the champion. For example, at 620, the challenger may be promoted to champion using a better test as indicated in equation 1, where a probabilistic lower and upper bound, are denoted by $\underline{L}_{c,t}$ and $\overline{L}_{c,t}$ respectively, and $\varepsilon_{C,t}$ is the gap.

That is, the challenger must be better than the champion by a certain amount, or gap. This ensures that the challenger is promoted into a champion only when it is sufficiently better than the old champion, thereby avoiding constant challenger/champion switching when the challenger is slightly better than the champion. If the challenger is promoted to champion, then the method may proceed to 606, where the configuration oracle may generate new models for the challenger pool based on the new champion.

$$\text{Better}(c,C,t) := \mathbb{1}\{\overline{L}_{c,t} < \underline{L}_{C,t} - \varepsilon_{C,t}\} \quad \text{Equation 1}$$

$$\text{Worse}(c,C,t) := \mathbb{1}\{\underline{L}_{c,t} > \overline{L}_{C,t}\} \quad \text{Equation 2}$$

In some examples, the challenger may have a worse performance such that the challenger should be removed from consideration altogether. That is, at 622, the worse performance of the challenger may be compared to the best performance of the champion in accordance with equation 2. For example, a loss lower bound of the challenger may be compared to the loss upper bound of the champion; if the loss lower bound of the challenger is greater than the loss upper bound of the champion, then the challenger may be removed from the challenger pool altogether at 624. Alternatively, or in addition, the method 600 may proceed to 610 if the challenger is not removed from the challenger pool.

The method 600 may end when a specific challenger and/or champion obtains a specific loss performance and/or after a threshold number of new champions or iterations.

Figure 7:
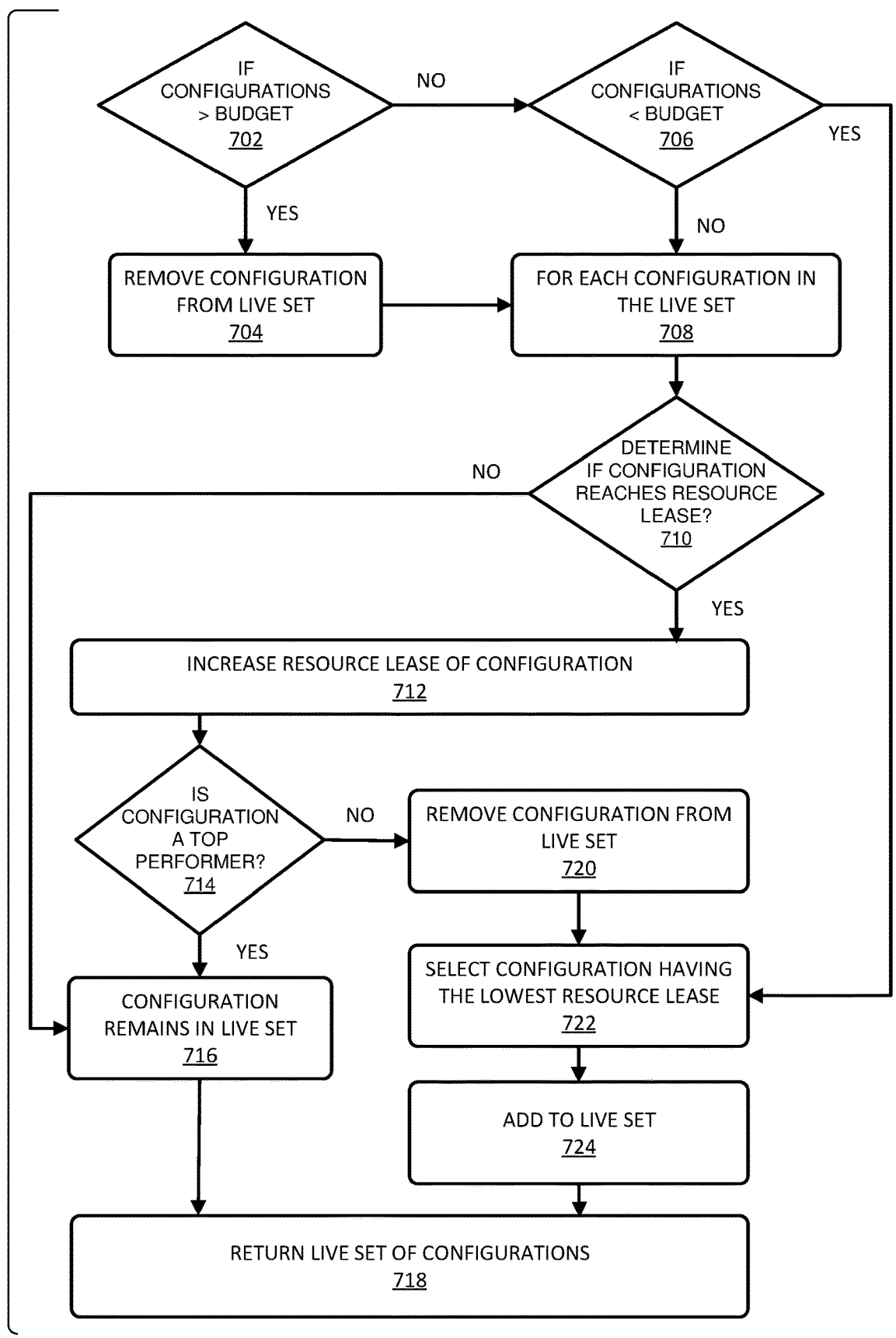
FIG. 7 depicts details of a method for scheduling tuning one or more hyperparameters in accordance with examples of the present disclosure.

FIG. 7 depicts details of a method 700 for selecting and scheduling one or more models for the live pool in accordance with examples of the present disclosure. A general order for the steps of the method 700 is shown in FIG. 7. The method 700 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computer or server and/or the scheduler 308 (FIG. 3). Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method may be initiated at 702 where an amount of resources used and performance information associated with one or more models. As a result of the method 700, the method 700 may output a selection of live model for use in the live model pool, such as the live model pool 310. That is the method 700 may output a set of models chosen from the candidate models, or set of challengers 306. At 702, a determination may be made as to whether resources required for a current set of configurations, that is the set of live models, exceeds a budget. If the resources used exceeds the current budget, then a configuration (e.g., model) may be removed from the set of live models and the method 700 may proceed to 708. Otherwise, the method may proceed to 706, where a determination may be mad as to whether the resources used are below or at the budget. In examples, the current amount of resources used is either at the budget or near the budget, the method may proceed to 708, where for each configuration in the live set, the method may determine a current lease and whether such lease has been reached by the configuration (e.g., model). If the configuration has not been reached, then the method 700 may proceed to 716 where the configuration remains in the live set. Alternatively, if the lease has been reached, the method proceeds to 712, where the lease associated with the configuration is increased. In examples, the lease may be doubled.

The method may proceed to 714 where a determination with respect to whether or not the configuration is a top performer is made. If the configuration is a top performer, for example within the top 50% of configurations, then the method may proceed to 716 where such configuration remains in the live set. Alternatively, if the configuration is not a top performer, for example is in the bottom 50%, then the method may proceed to 720 where the configuration is removed from the live set. The method 700 then proceeds to 722 where a configuration having the lowest or smallest resource lease is selected and added to the live set at 724. The live set of configurations may then be returned at 718. In examples, if the amount of resources used by the live set of configurations is less than the budget at 706, the method 700 may proceed to 722 where the configuration having the lowest resource lease is selected and added to the live set at 724. Accordingly, the set of live configurations may be returned at 718.

Figure 8:
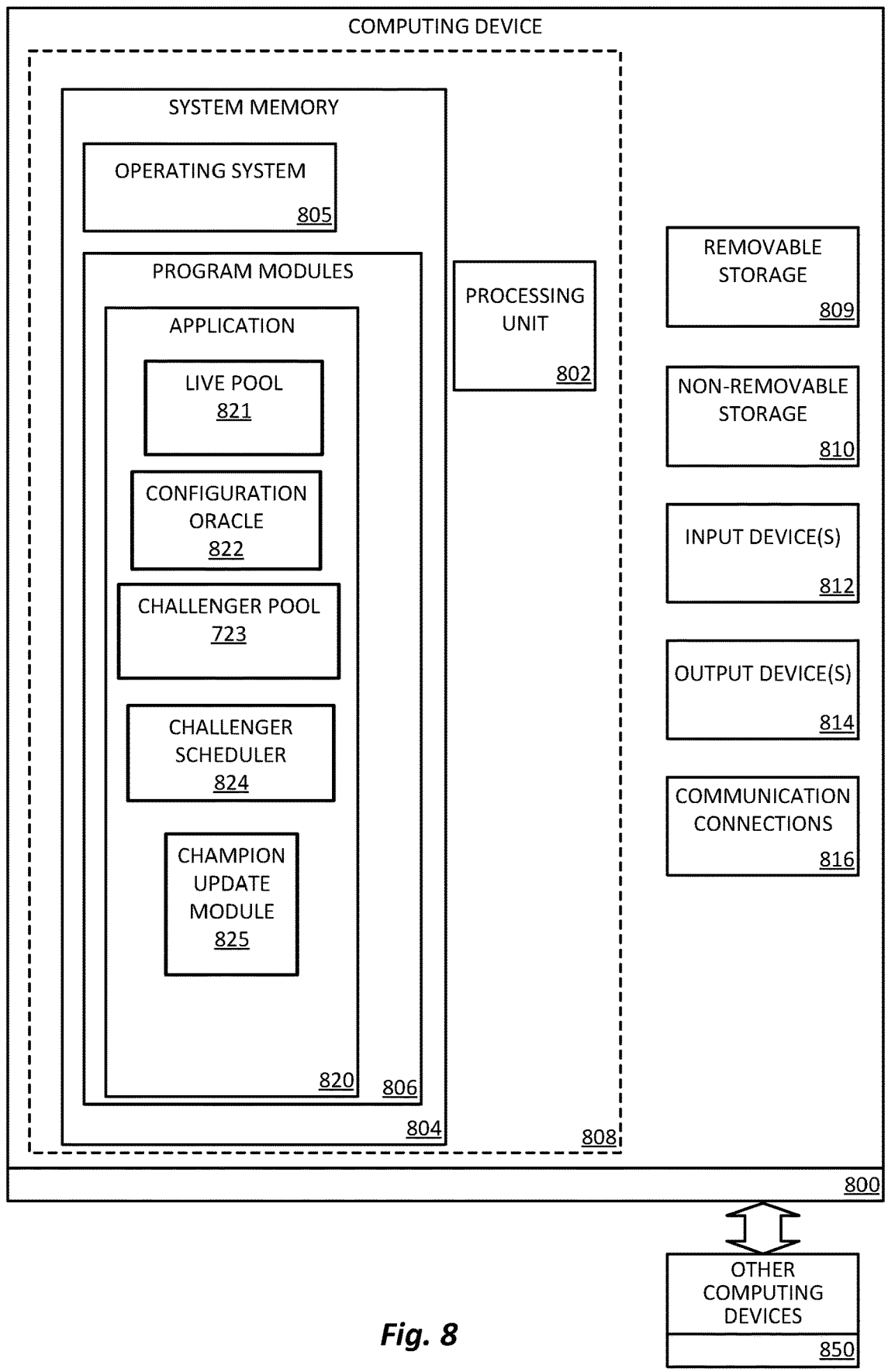
FIG. 8 depicts a block diagram illustrating physical components of a computing system with which aspects of the disclosure may be practiced.

FIG. 8 is a block diagram illustrating physical components (e.g., hardware) of a computing system 800 which aspects of the disclosure may be practiced. The computing system components described below may be suitable for the computing and/or processing devices described above. In a basic configuration, the computing system 800 may include at least one processing unit 802 and a system memory 804. Depending on the configuration and type of computing system, the system memory 804 may comprise, but is not limited to, volatile storage (e.g., random-access memory (RAM)), nonvolatile storage (e.g., read-only memory (ROM)), flash memory, or any combination of such memories.

The system memory 804 may include an operating system 805 and one or more program modules 806 suitable for running software application 820, such as one or more components supported by the systems described herein. As examples, system memory 804 may include a live pool 821, a configuration oracle 822, a challenger pool 823, a challenger scheduler 824, and/or a champion update module 825. The live pool 821 may be the same as or similar to the live pool 214 and/or the live challengers 310 as previously described. The configuration oracle 822 may be the same as or similar to the configuration oracle 216 and/or 304 as previously described. The challenger pool 823 may be the same as or similar to the challenger pool 218 and/or 306. The challenge scheduler 824 may be the same as or similar to the challenge scheduler 220 and/or 308 as previously described. The champion update module 825 may be the same as or similar to the champion update module 222 and/or 312 as previously described. In examples, the computing system 800 may be the same as or similar to the client device 102 (FIG. 1) and/or the online hyperparameter learning server 202 as previously described. As stated above, a number of program modules and data files may be stored in the system memory 804. While executing on the processing unit 802, the program modules 806 (e.g., software applications 820) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such a SOC device may include one or more processing units, graphics units, communications units, system virtualization units, and various application functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 800 may also have one or more input device(s) 812 such as a keyboard, a mouse, a pen, a sound or voice input device, a touch or swipe input device, etc. The output device(s) 814, such as a display, speakers, a printer, etc., may also be included. The aforementioned devices are examples, and others may be used. The computing system 800 may include one or more communication connections 816, allowing communications with other computing systems 850. Examples of suitable communication connections 516 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 800. Any such computer storage media may be part of the computing system 800. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
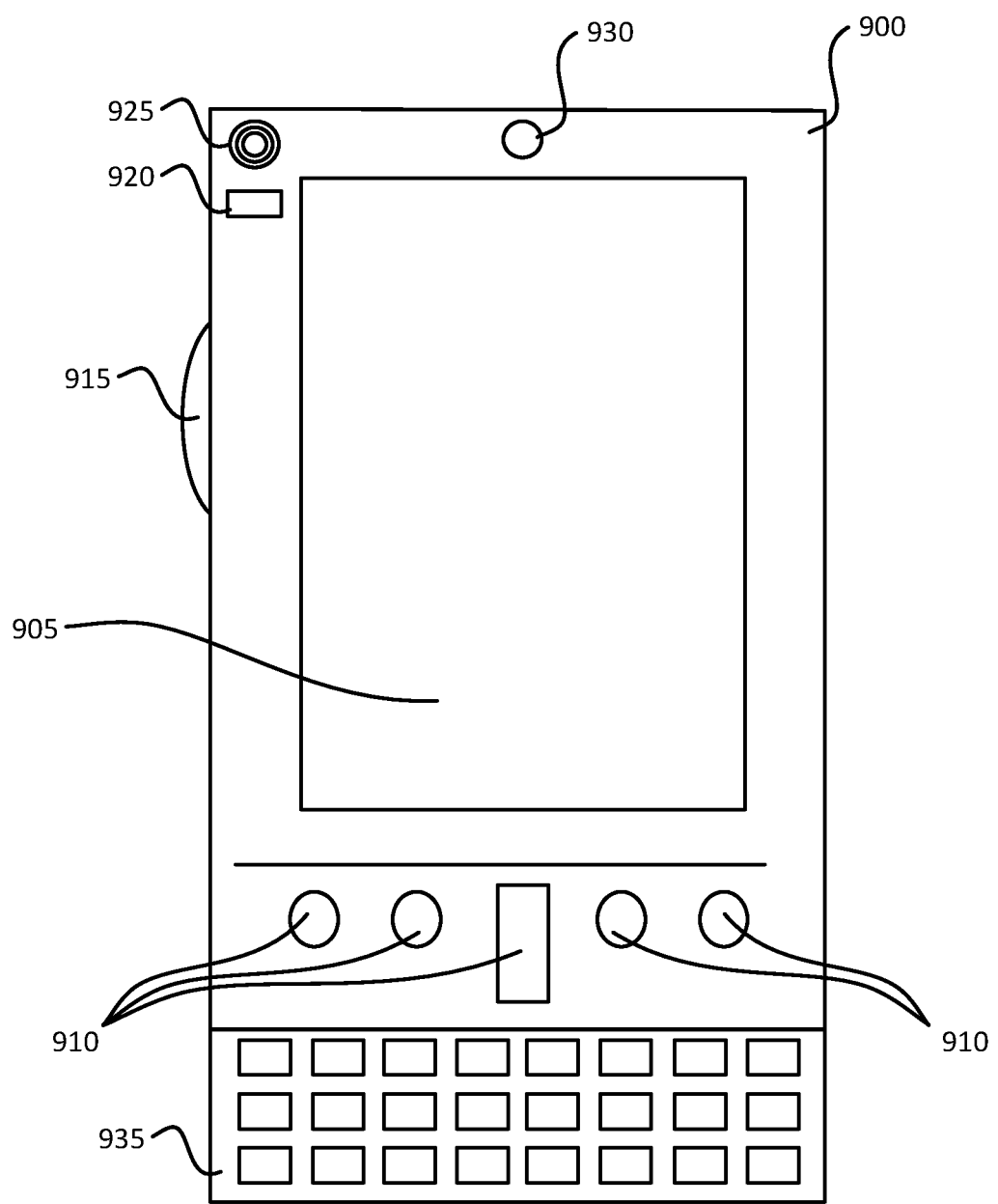
FIGS. 9A-9B depict details of one or more computing systems in accordance with examples of the present disclosure.
Figure 9B:
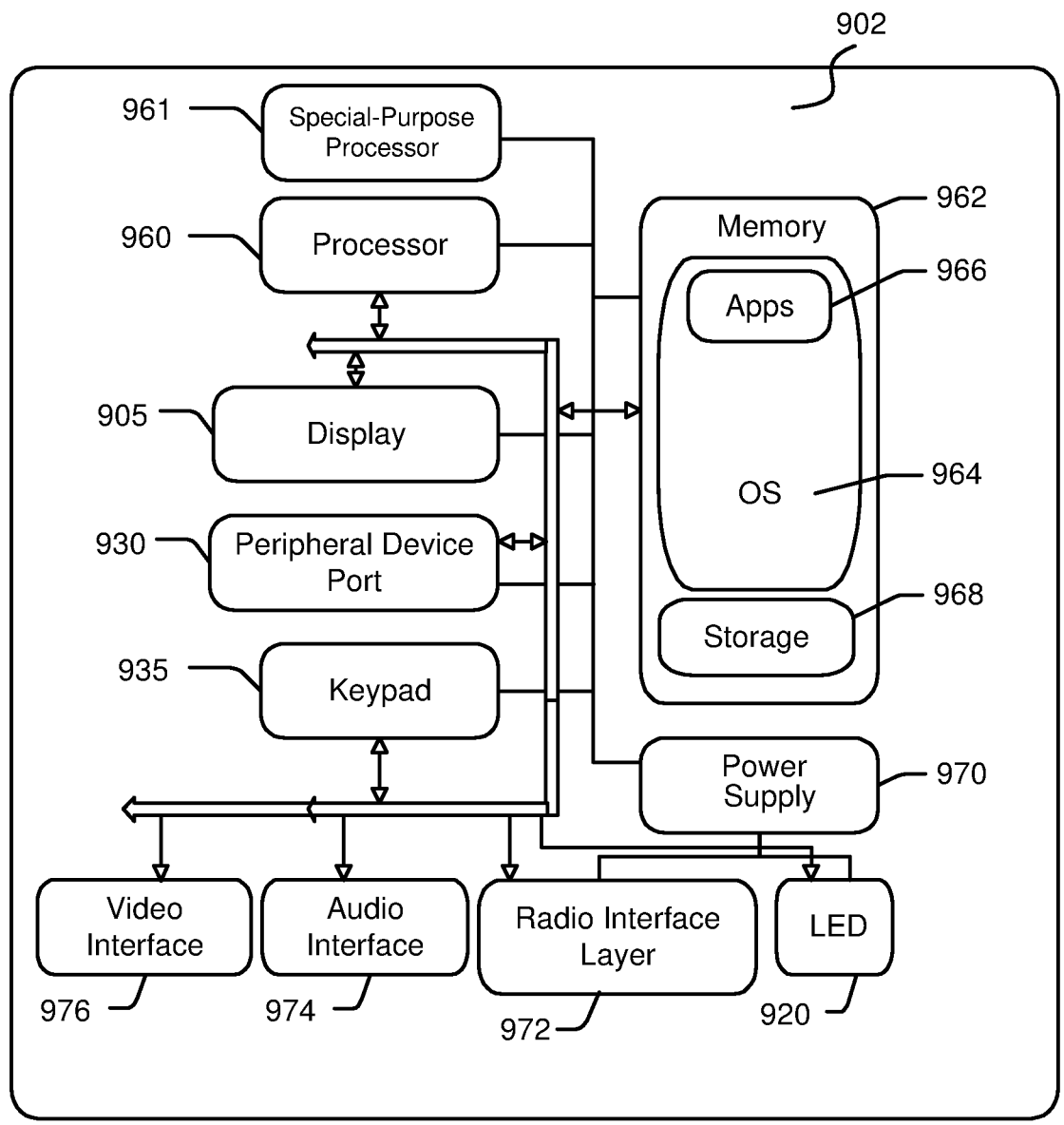

FIGS. 9A-9B illustrate a computing system 900, for example, a mobile telephone, a smart phone, wearable computer (such as a smart watch), a tablet computer, a desktop computer, a laptop computer, and the like, with which embodiments of the disclosure may be practiced. With reference to FIG. 9A, one aspect of a computing system 900 for implementing the aspects is illustrated. In a basic configuration, the computing system 900 is a desktop computer having both input elements and output elements. The computing system 900 typically includes a display 905, which may also function as an input device (e.g., a touch screen display). The computing system 900 may also include a keypad 935. The keypad 935 may be a physical keypad or a "soft" keypad generated on the touch screen display.

In various embodiments, the output elements include the display 905 for showing a graphical user interface (GUI), a visual indicator 920 (e.g., a light-emitting diode), and/or an audio transducer 925 (e.g., a speaker). In yet another aspect, the computing system 900 incorporates input and/or output ports, such as an audio input (e.g., a microphone jack), an audio output (e.g., a headphone jack), and a video output (e.g., an HDMI port) for sending signals to or receiving signals from an external device.

FIG. 9B is a block diagram illustrating the architecture of one aspect of a mobile computing system. That is, the computing system 900 can incorporate a system (e.g., an architecture) 902 to implement some aspects. In one embodiment, system 902 is implemented as a "computing system" capable of running one or more applications (e.g., browser, e-mail, calendaring, contact managers, messaging clients, games, and media clients/players). In some aspects, system 902 is integrated as a computing system, such as a desktop computer.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, maps programs, and so forth. System 902 also includes a nonvolatile storage area 968 within the memory 962. The nonvolatile storage area 968 may be used to store persistent information that should not be lost if the system 902 is powered down. The application programs 966 may use and store information in the nonvolatile storage area 968, such as e-mail or other messages used by an e-mail application, and the like. A synchronization application (not shown) also resides on system 902 and is programmed to interact with a corresponding synchronization application resident on a host computer to keep the information stored in the nonvolatile storage area 968 synchronized with corresponding information stored at the host computer. As should be appreciated, other applications may be loaded into the memory 962 and run on the computing system 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world" via a communications carrier or service provider. Transmissions to and from the radio interface layer 972 are conducted under the control of the operating system 964. In other words, communications received by the radio interface layer 972 may be disseminated to the application programs 966 via the operating system 964, and vice versa.

The system 902 may further include a video interface 976 that enables an operation of an on-board camera 930 to record still images, video stream, and the like. A computing system 900 implementing the system 902 may have additional features or functionality. For example, the computing system 900 may also include additional data storage devices (removable and/or non-removable) such as magnetic disks, optical disks, or tape. Such additional storage is illustrated in FIG. 9B by the nonvolatile storage area 968.

Data/information generated or captured by the computing system 900 and stored via the system 902 may be stored locally on the computing system 900, as described above, or the data may be stored on any number of storage media that may be accessed by the device via the radio interface layer 972 or via a wired connection between the computing system 900 and a separate computing system associated with the computing system 900, for example, a server computer in a distributed computing network, such as the Internet. As should be appreciated, such data/information may be accessed via the computing system 900 via the radio interface layer 972 or via a distributed computing network. Similarly, such data/information may be readily transferred between computing systems for storage and use according to well-known data/information transfer and storage means, including electronic mail and collaborative data/information sharing systems.

Figure 10:
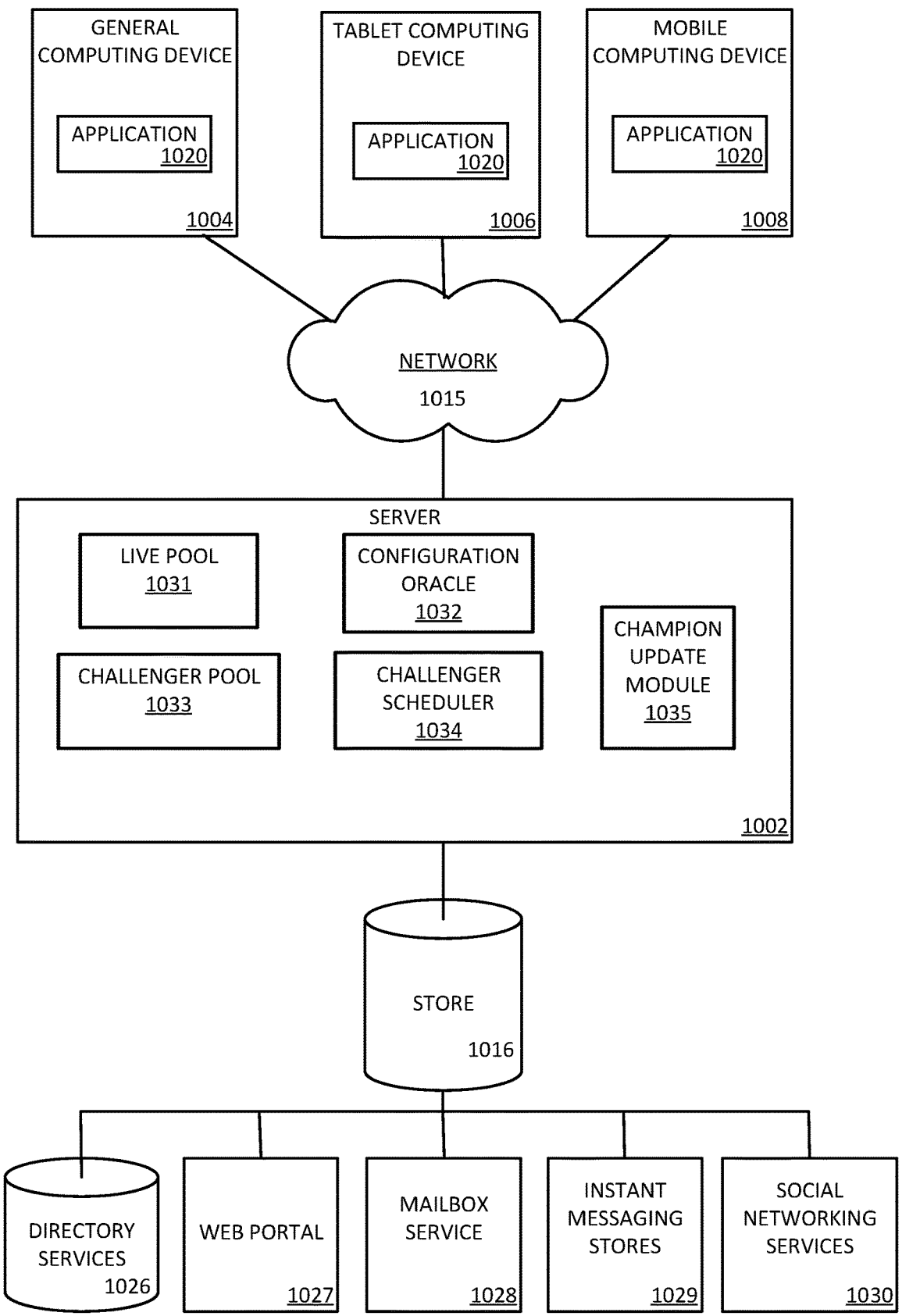
FIG. 10 depicts an architecture of a system for processing data received at a computing system in accordance with examples of the present disclosure.

FIG. 10 illustrates one aspect of the architecture of a system for processing data received at a computing system from a remote source, such as a personal computer 1004, a tablet computing device 1006, or mobile computing device 1008, as described above. Content at a server device 1002 may be stored in different communication channels or other storage types. For example, various files may be stored using a directory service 1026, a web portal 1027, a mailbox service 1028, an instant messaging store 1029, or social networking services 1030.

One or more of the previously described program modules 806 or software applications 820 may be employed by server device 1002 and/or the personal computer 1004, a tablet computing device 1006, or mobile computing device 1008, as described above. For example, the server device 1002 may include a live pool 1031, a configuration oracle 1032, a challenger pool 1033, a challenger scheduler 1034, and/or a champion update module 1035. The live pool 1031 may be the same as or similar to the live pool 821, 214, and/or the live challengers 310 as previously described. The configuration oracle 1032 may be the same as or similar to the configuration oracle 822, 216 and/or 304 as previously described. The challenger pool 1033 may be the same as or similar to the challenger pool 823, 218 and/or 306. The challenge scheduler 1034 may be the same as or similar to the challenge scheduler 824, 220 and/or 308 as previously described. The champion update module 1035 may be the same as or similar to the champion update module 825, 222 and/or 312 as previously described.

The server device 1002 may provide data to and from a client computing device such as a personal computer 1004, a tablet computing device 1006, and/or a mobile computing device 1008 (e.g., a smart phone) through a network 1015. By way of example, the computer system described above may be embodied in a personal computer 1004, a tablet computing device 1006, and/or a mobile computing device 1008 (e.g., a smart phone). Any of these embodiments of the computing devices may obtain content from the store 1016, in addition to receiving graphical data useable to be either pre-processed at a graphic-originating system or post-processed at a receiving computing system.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced includes keystroke entry, touch screen entry, voice or other audio entry, gesture entry where an associated computing device is equipped with detection (e.g., the camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

In accordance with examples of the present disclosure, a method for tuning a hyperparameter for a machine learning model, the method comprising: receiving a hyperparameter for tuning; generating a set of challenger configurations based on the hyperparameter; scheduling a subset of the set of challenger configurations for evaluation based on a loss function; comparing a loss value derived from the loss function for the set of challenger configurations to a loss value derived from the loss function for a champion configuration; replacing the champion configuration with a challenger configuration based on the comparison of the loss value derived from the loss function for the challenger configuration and the loss value derived from the loss function for the champion configuration; and generating a new set of challenger configurations based on a new champion configuration.

In accordance with at least one aspect of the above example, a number of challenger configurations scheduled for evaluation is based on a computational budget. In accordance with at least one aspect of the above example, the method further includes removing at least one challenger configuration from the set of challenger configurations based on a loss value derived from the loss function for the at least one challenger configuration and the loss value derived from the loss function for the champion configuration. In accordance with at least one aspect of the above example, the loss value derived from the loss function for the challenger configuration is a probabilistic upper bound for the challenger configuration and the loss value derived from the loss function for the champion configuration is a probabilistic lower bound for the champion configuration. In accordance with at least one aspect of the above example, the method further includes assigning each challenger configuration in the set of challenger configurations a resource lease; and increasing the resource lease over time. In accordance with at least one aspect of the above example, the method further includes determining that the challenger configuration in the subset of the set of challenger configurations has reached a limit associated with the resource lease; comparing a loss value derived from a loss function for the challenger configuration in the subset of the set of challenger configurations to a second loss value derived from the loss function for a second challenger configuration in the subset of the set of challenger configurations; and increasing the resource lease for the challenger configuration in the subset of the set of challenger configurations based on the comparison. In accordance with at least one aspect of the above example, the method further includes replacing the challenger configuration in the subset of the set of challenger configurations with another challenger configuration from the set of challenger configurations based on the comparison, wherein a resource lease of the another challenger configuration from the set of challenger configurations is the smallest resource lease in the set of challenger configurations. In accordance with at least one aspect of the above example, the hyperparameter indicates which namespaces interact together. In accordance with at least one aspect of the above example, each namespace includes a group of features. In accordance with at least one aspect of the above example, the method further includes receiving historical data samples; generating a prediction based on the historical data samples; and receiving at least one of full-information feedback or partial-information feedback based on the prediction.

In accordance with examples of the present disclosure, a system for tuning a hyperparameter for a machine learning model is described. The system may include a processor and memory including instructions which when executed by the processor, cause the processor to: receive a hyperparameter for tuning; receive configuration information associated with generating challenger configurations for the hyperparameter; generate a set of challenger configurations based on the hyperparameter and the configuration information; schedule a subset of the set of challenger configurations for evaluation based on a loss function; compare a loss value derived from the loss function for the challenger configurations to a loss value derived from the loss function for a champion configuration; replace the champion configuration with a challenger configuration based on the comparison of the loss value derived from the loss function for the challenger configuration and the loss value derived from the loss function for the champion configuration; and generate a new set of challenger configurations based on a new champion configuration.

In accordance with at least one aspect of the above example, the instructions, when executed by the processor, cause the processor to assign each challenger configuration in the set of challenger configurations a resource lease and increase the resource lease over time. In accordance with at least one aspect of the above example, the instructions, when executed by the processor, cause the processor to determine that the challenger configuration in the subset of the set of challenger configurations has reached a limit associated with the resource lease, compare a loss value derived from a loss function for the challenger configuration in the subset of the set of challenger configurations to a second loss value derived from the loss function for a second challenger configuration in the subset of the set of challenger configurations, and increase the resource lease for the challenger configuration in the subset of the set of challenger configurations based on the comparison. In accordance with at least one aspect of the above example, the instructions, when executed by the processor, cause the processor to replace the challenger configuration in the subset of the set of challenger configurations with another challenger configuration from the set of challenger configurations based on the comparison, wherein a resource lease of the another challenger configuration from the set of challenger configurations is the smallest resource lease in the set of challenger configurations. In accordance with at least one aspect of the above example, a number of challenger configurations scheduled for evaluation is based on a computational budget. In accordance with at least one aspect of the above example, the hyperparameter indicates which namespaces interact together and each namespace includes a group of features. In accordance with at least one aspect of the above example, the instructions, when executed by the processor, cause the processor to: receive historical data samples; generate a prediction based on the historical data samples; and receive at least one of full-information feedback or partial-information feedback based on the prediction.

In accordance with examples of the present disclosure, a computer-readable storage medium including instructions for tuning a hyperparameter for a machine learning model is described. The instructions, when executed by a processor, cause the processor to: receive a hyperparameter for tuning; generate a set of challenger configurations based on the hyperparameter; schedule a subset of the set of challenger configurations for evaluation based on a loss function; compare a loss value derived from the loss function for the set of challenger configurations to a loss value derived from the loss function for a champion configuration; replace the champion configuration with a challenger configuration based on the comparison of the loss value derived from the loss function for the challenger configuration and the loss value derived from the loss function for the champion configuration; and generate a new set of challenger configurations based on a new champion configuration.

In accordance with at least one aspect of the above example, a number of challenger configurations scheduled for evaluation is based on a computational budget. In accordance with at least one aspect of the above example, the instructions, when executed by the processor, cause the processor to remove at least one challenger configuration from the set of challenger configurations based on a loss value derived from the loss function for the at least one challenger configuration and the loss value derived from the loss function for the champion configuration. In accordance with at least one aspect of the above example, the instructions, when executed by the processor, cause the processor to assign each challenger configuration in the set of challenger configurations a resource lease. In accordance with at least one aspect of the above example, the instructions, when executed by the processor, cause the processor to determine that the challenger configuration in the subset of the set of challenger configurations has reached a limit associated with the resource lease, compare a loss value derived from a loss function for the challenger configuration in the subset of the set of challenger configurations to a second loss value derived from the loss function for a second challenger configuration in the subset of the set of challenger configurations, and increase the resource lease for the challenger configuration in the subset of the set of challenger configurations based on the comparison.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method for tuning a hyperparameter for a machine learning model, the method comprising:
   receiving a hyperparameter for tuning;
   generating a set of challenger configurations based on the hyperparameter;
   selecting a subset of challenger configurations from the set of challenger configurations based at least in part on a resource lease associated with each of the challenger configurations having a lowest resource lease;
   adding the subset of challenger configurations selected from the set of challenger configurations to a live pool for evaluation, wherein the live pool includes live running configurations of the machine learning model that are being simultaneously evaluated in a live environment;
   comparing a loss value derived from a loss function for each of the subset of challenger configurations to a loss value derived from the loss function for a champion configuration simultaneously in the live environment;
   selecting a challenger configuration from the subset of the challenger configurations based on the comparison;
   replacing the champion configuration with the challenger configuration; and
   generating a new set of challenger configurations based on a new champion configuration.

2. The method of claim 1, wherein a number of challenger configurations scheduled for evaluation is based on a computational budget.

3. The method of claim 2, further comprising removing at least one challenger configuration from the set of challenger configurations based on a loss value derived from the loss function for the at least one challenger configuration and the loss value derived from the loss function for the champion configuration.

4. The method of claim 2, wherein the loss value derived from the loss function for the challenger configuration is a probabilistic upper bound for the challenger configuration and the loss value derived from the loss function for the champion configuration is a probabilistic lower bound for the champion configuration.

5. The method of claim 1, further comprising:
   assigning each challenger configuration in the set of challenger configurations a resource lease; and
   increasing the resource lease over time.

6. The method of claim 5, further comprising:
   determining that the challenger configuration in the subset of the set of challenger configurations has reached a limit associated with the resource lease;
   comparing a loss value derived from the loss function for the challenger configuration in the subset of challenger configurations to a second loss value derived from the loss function for a second challenger configuration in the subset of the set of challenger configurations; and
   increasing the resource lease for the challenger configuration in the subset of the set of challenger configurations based on the comparison.

7. The method of claim 6, further comprising:
   based on the comparison, replacing the challenger configuration in the subset of the set of challenger configurations with another challenger configuration from the set of challenger configurations, wherein a resource lease of the another challenger configuration from the set of challenger configurations is the smallest resource lease in the set of challenger configurations.

8. The method of claim 1, wherein the hyperparameter indicates which namespaces interact together.

9. The method of claim 1, further comprising:
receiving historical data samples;
generating a prediction based on the historical data samples; and
receiving at least one of full-information feedback or partial-information feedback based on the prediction.

10. A system for tuning a hyperparameter for a machine learning model, the system comprising:
a processor; and
memory including instructions which when executed by the processor, cause the processor to:
receive a hyperparameter for tuning;
receive configuration information associated with generating challenger configurations for the hyperparameter;
generate a set of challenger configurations based on the hyperparameter and the configuration information;
select a subset of challenger configurations from the set of challenger configurations based at least in part on a resource lease associated with each of the challenger configurations having a lowest resource lease;
add the subset of challenger configurations selected from the set of challenger configurations to a live pool for evaluation, wherein the live pool includes live running configurations of the machine learning model that are being simultaneously evaluated in a live environment;
compare a loss value derived from a loss function for each of the subset of the challenger configurations to a loss value derived from the loss function for a champion configuration simultaneously in the live environment;
select a challenger configuration from the subset of the challenger configurations based on the comparison;
replace the champion configuration with the challenger configuration; and
generate a new set of challenger configurations based on a new champion configuration.

11. The system of claim 10, wherein the instructions, when executed by the processor, cause the processor to assign each challenger configuration in the set of challenger configurations a resource lease and increase the resource lease over time.

12. The system of claim 11, wherein the instructions, when executed by the processor, cause the processor to determine that the challenger configuration in the subset of the set of challenger configurations has reached a limit associated with the resource lease, compare a loss value derived from the loss function for the challenger configuration in the subset of the set of challenger configurations to a second loss value derived from the loss function for a second challenger configuration in the subset of the set of challenger configurations, and increase the resource lease for the challenger configuration in the subset of the set of challenger configurations based on the comparison.

13. The system of claim 12, wherein the instructions, when executed by the processor, cause the processor to replace the challenger configuration in the subset of the set of challenger configurations with another challenger configuration from the set of challenger configurations based on the comparison, wherein a resource lease of the another challenger configuration from the set of challenger configurations is the smallest resource lease in the set of challenger configurations.

14. The system of claim 13, wherein a number of challenger configurations scheduled for evaluation is based on a computational budget.

15. The system of claim 10, wherein the instructions, when executed by the processor, cause the processor to:
receive historical data samples;
generate a prediction based on the historical data samples; and
receive at least one of full-information feedback or partial-information feedback based on the prediction.

16. A computer-readable storage medium including instructions, when executed by a processor, cause the processor to:
receive a hyperparameter for tuning;
generate a set of challenger configurations based on the hyperparameter;
select a subset of challenger configurations from the set of challenger configurations based at least in part on a resource lease associated with each of the challenger configurations having a lowest resource lease;
add the subset of challenger configurations selected from the set of challenger configurations to a live pool for evaluation, wherein the live pool includes live running configurations of the machine learning model that are being simultaneously evaluated in a live environment;
compare a loss value derived from a loss function for each of the subset of challenger configurations to a loss value derived from the loss function for a champion configuration simultaneously in the live environment;
select a challenger configuration from the subset of the challenger configurations based on the comparison;
replace the champion configuration with the challenger configuration; and
generate a new set of challenger configurations based on a new champion configuration.

17. The computer-readable storage medium of claim 16, wherein a number of challenger configurations scheduled for evaluation is based on a computational budget.

18. The computer-readable storage medium of claim 17, wherein the instructions, when executed by the processor, cause the processor to remove at least one challenger configuration from the set of challenger configurations based on a loss value derived from the loss function for the at least one challenger configuration and the loss value derived from the loss function for the champion configuration.

19. The computer-readable storage medium of claim 16, wherein the instructions, when executed by the processor, cause the processor to assign each challenger configuration in the set of challenger configurations a resource lease.

20. The computer-readable storage medium of claim 19, wherein the instructions, when executed by the processor, cause the processor to determine that the challenger configuration in the subset of the set of challenger configurations has reached a limit associated with the resource lease, compare a loss value derived from the loss function for the challenger configuration in the subset of the set of challenger configurations to a second loss value derived from the loss function for a second challenger configuration in the subset of the set of challenger configurations, and increase the resource lease for the challenger configuration in the subset of the set of challenger configurations based on the comparison.

* * * * *